United States Patent
Pearson

(10) Patent No.: US 7,643,625 B2
(45) Date of Patent: Jan. 5, 2010

(54) METHOD OF AND SYSTEM FOR ALTERING INCOMING CALL CONTROLS AFTER A CALL HAS BEEN PLACED TO AN EMERGENCY NUMBER

(75) Inventor: Larry B. Pearson, San Antonio, TX (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 1044 days.

(21) Appl. No.: 10/837,501

(22) Filed: Apr. 29, 2004

(65) Prior Publication Data

US 2005/0243974 A1  Nov. 3, 2005

(51) Int. Cl.
   *H04M 3/42* (2006.01)
(52) U.S. Cl. .................. 379/201.01; 379/45; 379/196; 379/210.02
(58) Field of Classification Search ............ 379/210.01, 379/210.02, 210.03
   See application file for complete search history.

(56) References Cited

U.S. PATENT DOCUMENTS

| | | | |
|---|---|---|---|
| 5,467,388 A * | 11/1995 | Redd et al. ............. | 379/210.02 |
| 5,563,935 A | 10/1996 | Small | |
| 5,732,125 A * | 3/1998 | Oyama ..................... | 455/404.1 |
| 5,995,603 A | 11/1999 | Anderson | |
| 6,289,084 B1 | 9/2001 | Bushnell | |
| 6,298,122 B1 | 10/2001 | Horne | |
| 6,332,073 B1 * | 12/2001 | Nilsson et al. ........... | 455/404.1 |
| 6,359,970 B1 | 3/2002 | Burgess | |
| 6,456,706 B1 | 9/2002 | Blood et al. | |
| 6,529,596 B1 * | 3/2003 | Asprey et al. ............... | 379/224 |
| 6,690,770 B2 | 2/2004 | Brandt | |
| 7,190,947 B2 * | 3/2007 | Binzel et al. ............. | 455/404.1 |
| 2002/0009184 A1 | 1/2002 | Shnier | |
| 2003/0157923 A1 * | 8/2003 | Tani ........................... | 455/404 |
| 2004/0086093 A1 * | 5/2004 | Schranz ....................... | 379/37 |
| 2004/0203576 A1 * | 10/2004 | Droste et al. ............. | 455/404.1 |

\* cited by examiner

*Primary Examiner*—William J Deane
*Assistant Examiner*—Khai N Nguyen
(74) *Attorney, Agent, or Firm*—Brinks Hofer Gilson & Lione

(57) ABSTRACT

According to the various embodiments of the present invention, an outbound call to a number on an emergency call list may change the incoming call controls to a telephone. In particular, methods of altering incoming call controls after a call has been placed to an emergency number comprises steps of performing a first modification of a first call control related to a first incoming calling number, and performing a second modification of the first call control related to the first incoming calling number after a predetermined period of time. Systems for altering incoming call controls after a call has been placed to an emergency number are also disclosed.

11 Claims, 4 Drawing Sheets

METHOD OF AND SYSTEM FOR ALTERING INCOMING CALL CONTROLS AFTER A CALL HAS BEEN PLACED TO AN EMERGENCY NUMBER

FIELD OF THE INVENTION

The present invention relates generally to telecommunication systems, and in particular, to a method of and system for altering incoming call controls after a call has been placed to an emergency number.

BACKGROUND OF THE INVENTION

Currently, voice telecommunication networks apply incoming call controls (ICC) to inbound or incoming calls. Incoming call controls affect how calls are processed by the network. Complex incoming call controls may include a number of rules, which are preferably applied in order. Each incoming call control rule may be implemented using a two step call processing model. The first step of the rule is to identify the call to tell whether the rule should be applied, and the second step of the rule is to dispose of the call to which the rule should be applied. Optionally, these rules may be selected and defined by the customer on the receiving end of the calls. Such selection and definition may be implemented using a Web User Interface or other interface.

Further, incoming call controls may be of increased sophistication as they are integrated with external sources of information like Personal Address Books (PAB), calendars, and call logs. An example of increased incoming call control complexity is when a household desires to limit calls between 10:00 PM at night and 8:00 AM in the morning to those numbers listed in their PAB. In this example, all night-time calls received from telephone numbers not listed in the PAB may be blocked by an announcement, such as "The party you have called doesn't accept calls during this time. Please try your call again later."

Incoming call controls may be used, for example, to make a person more accessible or less accessible. An example of an incoming call controls that may make customers more accessible is a locating service, which may attempt to find the called party at a different telephone number than the one dialed. The locating service may involve the end-user publishing a "primary" number. The primary number may be a DID number associated with a call answering service or a telephone number (wireless or wireline) with a call answering service like Plain Old Voicemail (POVM) or Unified Messaging Service (UMS) that includes a locating capability. When a caller calls and the locating service is activated, the service may say something such as, "<Name Announcement> is not available right now. Please speak your name after the tone and I will attempt to locate them or press one to go directly to voicemail. <BEEP>" The subscriber may record this name announcement during the setup for their service. Next, the caller speaks their name. Then the system may say, "Please hold while I locate them."

The service may dial each of the telephone numbers in the end-user's contact list. Two exemplary methods of doing this are to call each number in the contact list one at a time or to call all numbers in the contact list at the same time. The caller may be restricted from hearing what is going on with regard to the called contact numbers, such that he is effectively on hold. If any of the dialed numbers is answered, the person answering the call may hear, "<Name Announcement> has a call from <Caller's Spoken Name>. To take the call, press one. To send the call to voicemail press two." The called party may also be required to provide a Personal Identification Number (PIN) to authenticate that they are really the subscriber. If the subscriber accepts the call, the caller is connected to the end-user on the answered phone. Otherwise, the caller may be directed to the end-user's voicemail service. However, as should be apparent, callers often endure a delay as they wait for the locating service to find the subscriber.

An example of an incoming call controls that may make a person less accessible is a privacy failure, which may help customers avoid telemarketing calls. However, even the most well thought out incoming call control rules may reduce a customer's ability to be contacted when applied to all inbound calls, especially during emergencies. For example, a privacy feature may be activated when a caller's telephone number information is unknown or unavailable to the terminating network. When the calling party information is unavailable, the call may be directed to the privacy feature instead of ringing through to the called party's phone. The privacy feature may force the caller to provide either their name or a DTMF PIN number. When the caller doesn't have a PIN number, they may be required to state their name. The privacy feature may then call the called party and ask them if they wish to take the call. Again, such features provide significant delays for a calling party trying to reach a called party.

Incoming call control has two ways of looking at inbound calls. The first (shown) is by telephone number. Telephone numbers can be entered manually or selected from a list of telephone numbers generated by scanning the address book. The second method (not shown) is by name. When names are used, they are matched to the address book and all telephone numbers associated with the name are treated by the same inbound call management "rule." Matching inbound calls can be given a distinctive ring tone. The distinctive ring tone sets the call apart from other inbound calls. Inbound calls can be forwarded to different destinations based on a ring/no answer rule. The subscriber has the ability to select the number of rings the call makes on the customer's phone before being forwarded. Calls can be forwarded to another number or voicemail. Additionally, inbound calls can be directed into a locating type service. The locating capability can try each of the possible terminating numbers in sequence or in parallel. The sequential mode works like most locating implementations, while the parallel mode works like simultaneous ring feature.

A blocking capability could also be used. Callers who are blocked hear a system announcement indicating that the called party has elected not to receive calls from the calling party. Alternatively, the caller can hear a busy signal as though the customer's line is always busy even when the line isn't busy. Another alternative would be that the caller could hear a ring tone as though the customer's line never answers. In this mode, the customer would not hear ringing on their line. Only the caller would hear ringing. The caller can be directed to different announcements, thereby providing interactive call blocking. The announcements can be the called party is unavailable, the called party doesn't accept telemarketing calls, a personal announcement recorded by the subscriber, a holiday greeting recorded by the customer, etc.

A caller could be asked to provide the system with their name. Once a name is recorded by the system, a call is placed to the customer's phone asking the customer if they wish to take a call from the calling party. The customer can elect to direct the call to an announcement (matching the recorded announcements described in the previous paragraph), accept the call, or forward the call directly into voicemail. Blocked calls that are blocked by an announcement or interactive call blocking can be overridden by a subscriber defined PIN number. The caller would enter the PIN during the announcement and the call would be directed to the customer's number. The capabilities described above can be applied based on a schedule, such as date/time controls set by the user on a webpage.

A shortcoming of conventional networks is that these incoming call controls may impede legitimate calls in an emergency situation. In the situation where an emergency arises in the house, one incoming call controls methodology may suggest that a phone number of an emergency service might use to call a household be included the PAB. Then, calls from this number could be passed through to the household. This may work for some known emergency services numbers, but this methodology would be impractical because it would not work in all situations. For example, emergency services personnel often carry wireless phones or call from emergency call centers. The many telephones that emergency service personnel use may render this solution infeasible. Moreover, there is no telephone line class (payphone, hotel, regular phone, etc.) that identifies emergency services in the inbound call's setup information.

Accordingly, there is a need for an improved a method of and system for altering incoming call controls after a call has been placed to an emergency number.

SUMMARY OF THE INVENTION

According to the various embodiments of the present invention, an outbound call to a number on an emergency call list may change the incoming call controls to a telephone. In particular, a method of altering incoming call controls after a call has been placed to an emergency number comprises steps of performing a first modification of a first call control related to a first incoming calling number; waiting a predetermined period of time after performing the first modification; performing a second modification of the first call control related to the first incoming calling number.

According to another aspect of the present invention, a method of altering incoming call controls after a call has been placed to an emergency number comprises steps of detecting a call placed to one of a plurality of numbers on a list of emergency numbers; and performing a first modification of a first call control related to a first incoming calling number during a predetermined period of time in response to the call.

Finally, a method of altering incoming call controls after a call has been placed to an emergency number comprises of performing a first modification of a first call control related to a first incoming calling number in response to the call; and maintaining a second call control related to a second incoming calling number.

Systems for altering incoming call controls after a call has been placed to an emergency number are also disclosed. For example, a system according to one embodiment comprises a subscriber device coupled to a telecommunications network; a call processing module coupled to the subscriber device by way of the telecommunications network; wherein the call processing module performs a first modification of a first call control related to a first incoming calling number and performs a second modification of the first call control related to the first incoming calling number after a predetermined period of time after performing the first modification.

According to an alternate embodiment, a system altering incoming call controls after a call has been placed to an emergency number, the system comprising a subscriber device coupled to a telecommunications network; a call processing module coupled to the subscriber device by way of the telecommunications network; and a network access module coupled to the call processing module enabling a subscriber to establish rules for performing a first modification of a first call control related to a first incoming calling number and performing a second modification of the first call control related to the first incoming calling number after a predetermined period of time after performing the first modification.

DETAILED DESCRIPTION OF THE DRAWINGS

Figure 1:
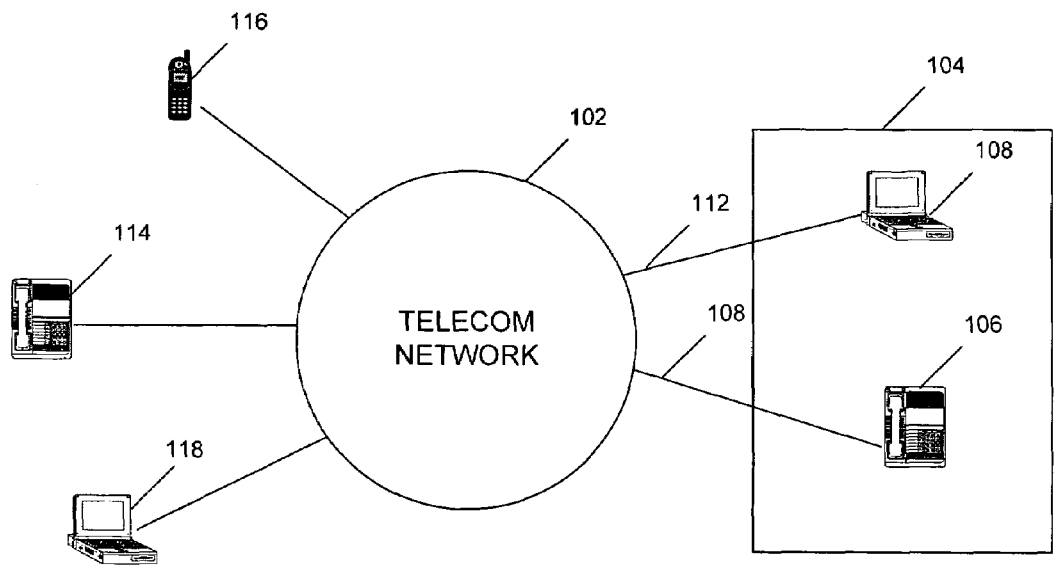
FIG. 1 is a system level diagram of a telecommunication system for altering incoming call controls after a call has been placed to an emergency number according to the present invention.

Turning first to FIG. 1, a system level diagram of a telecommunication system for altering incoming call controls after a call has been placed to an emergency number according to the present invention is shown. In particular, a telecommunications network 102 is coupled to a building 104, such as a residence, having a telephone subscriber device 106 coupled to the telecommunications network by a telecommunications link 108. The telecommunications link could be, for example, a wireline link or a wireless link. The telecommunication could also be any communication network, including a wireline or wireless network. The building also preferably comprises a computer 110 coupled to the telecommunications network 102 by way of a communication link 112. The computer 110 preferably comprises a network access device such as a dialup modem for accessing the telecommunications network. Alternatively, the computer 110 could bet coupled to the telecommunications network by way of a digital subscriber line connection or a cable modem. The operation of the computer 110 will be described in more detail in reference to FIG. 2. Although the telephone subscriber unit 106 and the computer 110 are shown at the same location, the two devices could be employed at difference locations. Finally, the telecommunication network enables communication with a plurality of devices which could make a call to the telephone subscriber device 104, including another wireline subscriber unit 114, a cellular telephone 116, or another computer 118.

Figure 2:
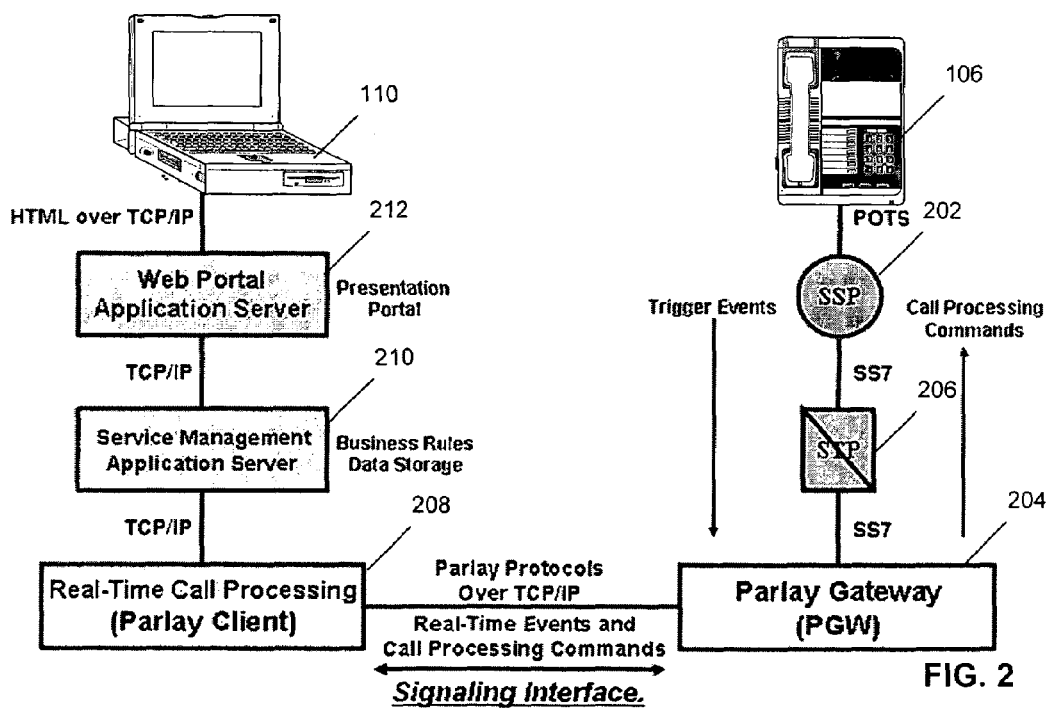
FIG. 2 is a block diagram of system for enabling a subscriber to establish rules for altering call controls according to the present invention.

Turning now to FIG. 2, a block diagram of system for enabling a subscriber to establish rules for altering call controls according to the present invention is shown. The individual elements that make up the high level reference architecture are described below. This reference architecture shows the wireline voice network elements (SSP and STP), Parlay Gateway, Real-Time Call Processing (Parlay Client), Service Management Application Server, and the Web Portal Application Server. Although this reference architecture as shown generally applies to wireline, wireless, and VoIP telephone system implementations, there are other ways to perform the same incoming call control functions. For example, in the wireline network, Parlay Gateways and Clients (Call Processing Server) may be replaced with a pure AIN implementation utilizing SCPs instead of the Parlay components.

The reference architecture preferably applies to any Local Exchange Carrier (LEC), where Plain Old Telephone Service (POTS) lines form the base telephone service for this complex incoming call control service. POTS lines preferably include 1FB and 1FR lines2. The complex incoming call controls according to the present invention will replace as many switch based and AIN based vertical features as possible, although Caller ID and Call Waiting features are preferably available according to the embodiment of the present invention. All other features will be implemented as capabilities using this network infrastructure.

SSP Signal Switching Points (SSP) 202 are telephone switches which, for most switch types 3, trigger information sent on a line by line basis. Customer lines according to the present invention are preferably configured so that trigger events are sent to an assigned Parlay Gateway 204 by way of a signal transfer point (STP) 206, and not to the normal AIN SCP.

The STP 206 route SS7 messages (including AIN trigger event messages) to the correct SCP device based on the point code specified in the message. In a way, the STP 206 acts as a data router. The STP routes data being exchanged between SSPs and SCPs, such as Parlay Gateways according to the present invention. In the legacy wireline TDM network, the Parlay Gateway looks like a Service Control Point (SCP). Like any SS7 network terminating device, it has a point code assigned to it. AIN trigger event messages and responses are exchanged between SSPs and Parlay Gateways using Signal Transfer Points (STP) as an intermediate router. Although the Parlay Gateway does not necessarily perform call control, it functions as a gateway interface allowing a Parlay Client (shown as the Real-Time Call Processing module) to perform call control functions. The Parlay Gateway acts as an intermediary between the legacy wireline TDM network and the Parlay Client. The Real-Time Call Processing module 210 (i.e. Parlay Client) implements the call control logic directing the underlying network's call handling through a Parlay Gateway. Additionally, the Parlay Client collects call information for later retrieval by end-users in the call logs.

A Service Management Application Server 210 interfaces with the Real-Time Call Processing (Parlay Client) to provide customer supplied rules on how calls are to be handled. The Real-Time Call Processing module also provides the Service Management Application Server with call information for logging purposes. The program logic and call control logic can be implemented, for example, in Java. Service Management Application Server. The Service Management Application Server collects call information from the Real-Time Call Processing module. It also provides the Real-Time Call Processing module with call processing rules to apply to customer calls, where persistent data is stored.

A Web Portal Application Server 212 also uses this module for access to persistent application data. The Web Portal Application Server affects changes to call handling or call controls through the Service Management Application Server. The complex incoming call controls web interface is preferably implemented in the Web Portal Application Server. The Web Portal Application Server preferably uses the Service Management Application Server as a resource for call and call control information. The Web Portal Application Server may be integrated with other web based LEC services to provide single session and single sign-on between the complex incoming call controls and other external portals. To use this service, the end-user would preferably have a personal computer (PC) that meets the minimum requirements for DSL access, dial-up or broadband Internet access.

Figure 3:
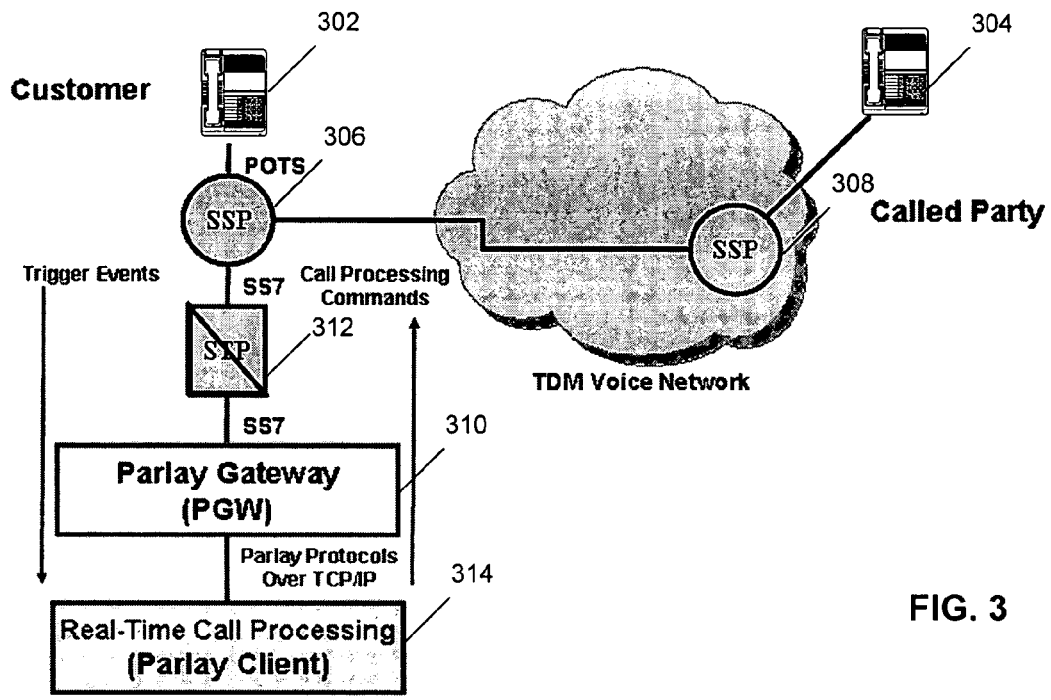
FIG. 3 is a block diagram showing outgoing call control according to the present invention.

Turning now to FIG. 3, a block diagram shows outgoing call control according to the present invention. In this model, all outbound calls made from the customer's phone 302 to a called party by way of SSP 306 and SSP 308 are monitored. If a dialed number is in the list of emergency telephone numbers, the incoming call controls are suppressed/modified to an emergency call processing state for a period of time (e.g. 60 minutes). When the customer goes off-hook and dials a telephone number, the SSP sends an AIN message to the Parlay Gateway 310 by way of an STP 312. The Gateway translates and sends the event to the Real-Time Call Processing module 314. When the Real-Time Call Processing module receives the dialed number, the number is compared against a list of emergency telephone numbers. If the number matches, then the line is set to Emergency Call Mode and a timer is started. The timer value is set by the customer to a value between 30 minutes and 24 hours. A default time, such as 60 minutes, could be set if the customer does not set a time. When the timer expires, the line is set returned from the Emergency Call Mode back to a normal state. The settings for emergency call mode will be described in more detail in reference to the flowcharts of FIGS. 5 and 6.

Figure 4:
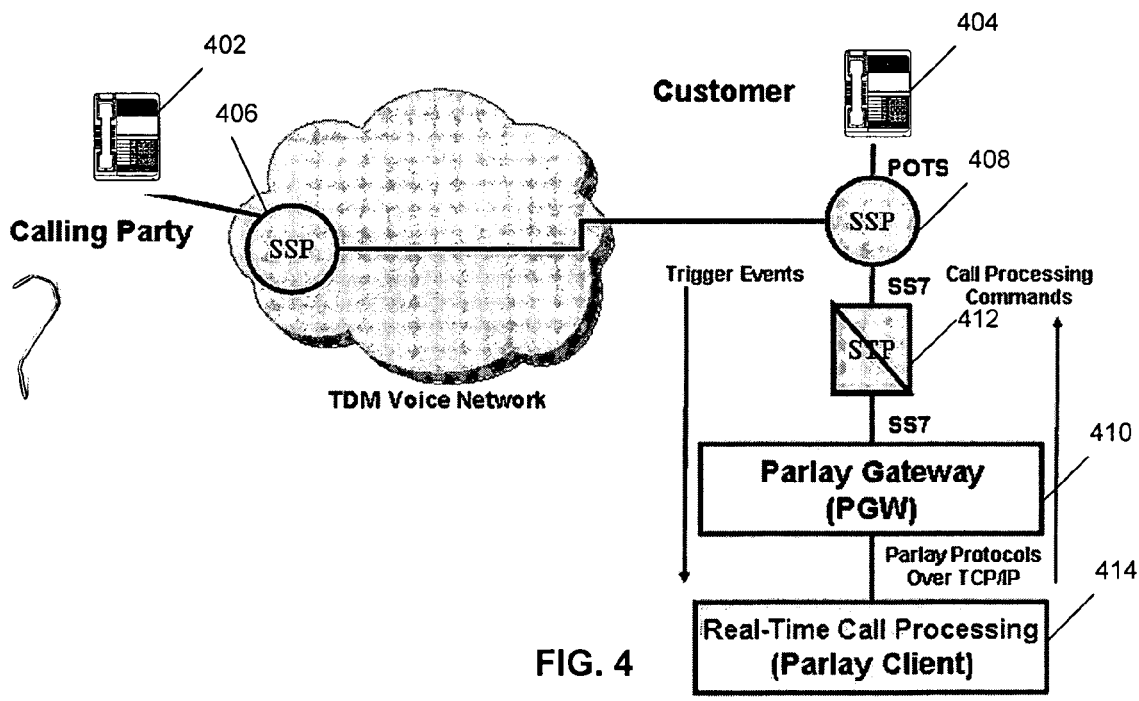
FIG. 4 is a block diagram showing incoming call control according to the present invention.

Turning now to FIG. 4 is a block diagram showing incoming call control according to the present invention. The calling party 402 dials the customer's phone 404 by way of an SSP 406. Before the customer's line ring, an AIN event is sent by the customer's SSP 408 to the Parlay Gateway 410 by way of STP 412. The Parlay Gateway translates the event and forwards it on to a Real-Time Call Processing module 414. The Real-Time Call Processing module checks to see if the line is in an Emergency Call Processing mode. If the Emergency Mode is active, then program control over call processing is given to the Emergency Mode Call Processing module. Otherwise, normal call processing through the Incoming Call Control module is performed.

The Emergency Mode Call Processing module can be as simple as pass all calls through to the customer. It may have levels of complexity added to retain some functionality for the subscriber. For example, after 10 rings, the call might be forwarded on to voicemail. When emergency calls are placed from a telephone, it is critically important that Incoming Call Controls don't interfere with emergency services personnel attempting to call back the original caller. The embodiments of the present invention ensure that customer safety is preserved while making advanced telephone features and capabilities available.

Figure 5:
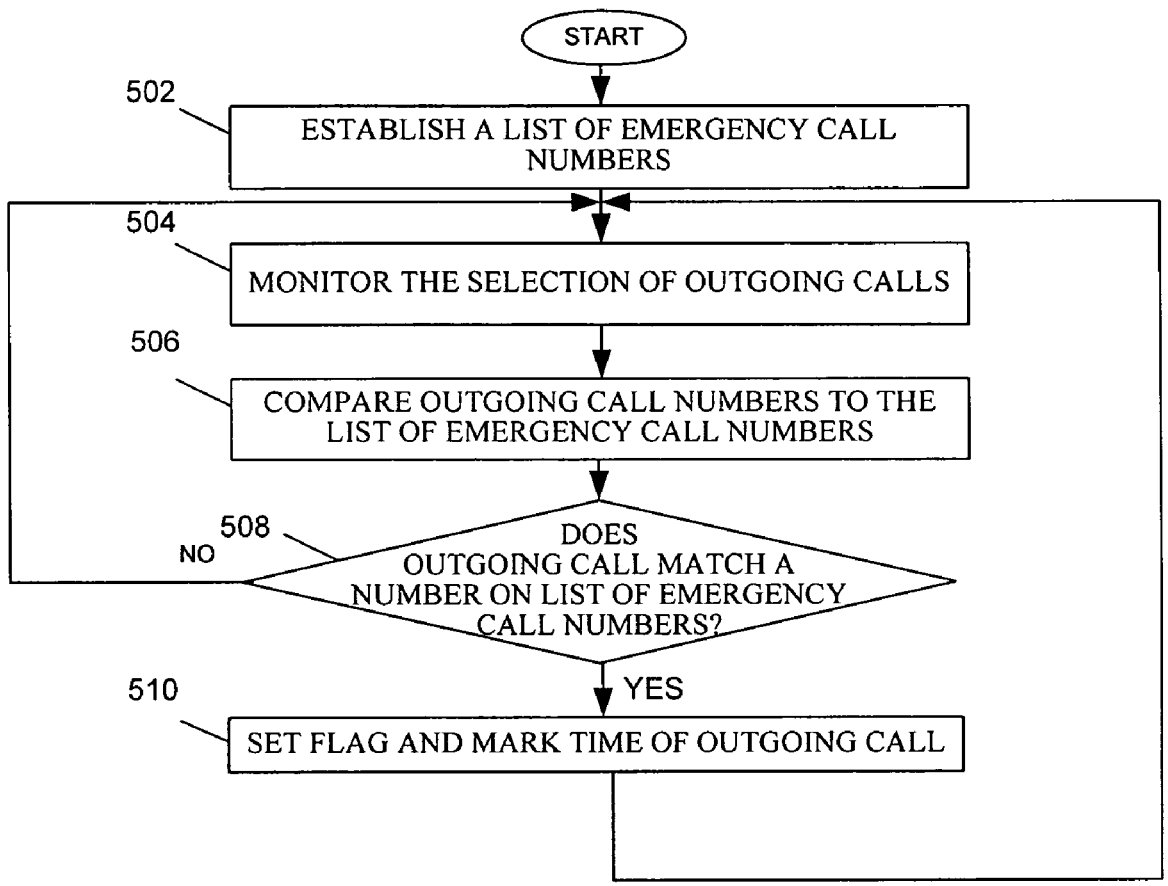
FIG. 5 is a flow chart showing steps of monitoring outgoing calls according to the present invention.

Turning now to FIG. 5 is a flow chart showing monitoring inbound calls according to the present invention. In particular, a list of emergency call numbers are established at a step 502. The obvious emergency numbers are 911 (in areas served by 911 service) or direct calls to police, fire, or medical (ambulance) emergency services. Because emergency calls can be made by a household member or by an alarm system, it is important to consider customers with alarm service may have calls made to the alarm service by their alarm system. Depending on the customer's circumstance, emergency numbers in addition to the alarm company number may need to be configured by the subscriber as well. These might include a doctor's number, the poison control center, a hospital, etc. The selection of outgoing call numbers is monitored at a step 504. The outgoing call numbers are compared to a list of emergency call numbers at a step 506. It is then determined whether a call has been initiated to a number on the list of emergency numbers at a step 508. A flag is set and the time of the outgoing call is marked at a step 502. As will be described in more detail in reference to FIG. 6, Outgoing call information may assist the incoming call controls in determining the inbound call context.

Figure 6:
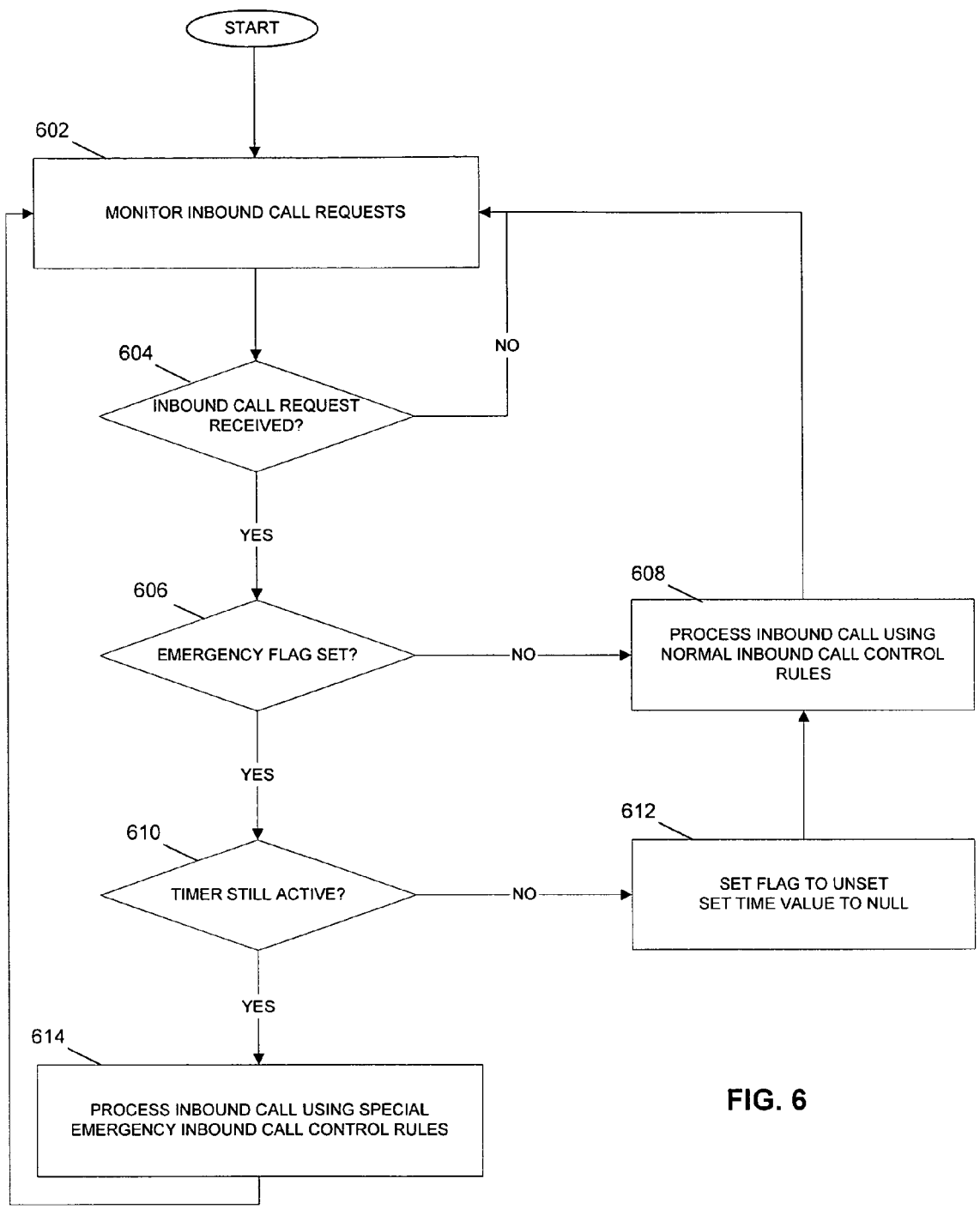
FIG. 6 is a flow chart showing altering incoming call controls after a call has been placed to an emergency number according to the present invention.

Turning now to FIG. 6 is a flow chart showing altering incoming call controls after a call has been placed to an emergency number according to the present invention. In particular, the network will monitor inbound call requests at a step 602. It will then determine if an inbound call request is received at a step 604. If so, it is then determined whether an emergency flag indicating that an outgoing call had been made to a number on the list of emergency numbers, is set at a step 608. If not, the network will process the inbound call using normal inbound call control rules at a step 610. If the emergency flag is set, it will then determine whether a timer is still active at a step 612. If not, the flag is unset and the time value is set to null at a step 614. If the timer is still active, the inbound call is processed using special emergency inbound call controls.

A modification of a call controls could include modifications from a list comprising a privacy manager call control; an anonymous call rejection call control; a selective call forwarding call control; an interactive call screening call control; an interactive call blocking call control, or other call controls well known in the art. Further, if a call was placed to an emergency number on the list of emergency numbers, the incoming call controls may optionally not block any incoming calls for a period of time. Alternatively, some incoming call controls can remain inactive. For example, an incoming call controls may be left active that, after ten rings, directs a caller to voicemail, or specific blocked numbers, such as numbers of harassing callers, could remain blocked.

It can therefore be appreciated that the new and novel system and method of a method of altering incoming call controls after a call has been placed to an emergency number has been described. It will be appreciated by those skilled in the art that, in particular to the teaching herein, numerous alternatives and equivalents will be seen to exist which incorporate the disclosed invention. As a result, the invention is not to be limited by the foregoing embodiments, but only by the following claims.

I claim:

1. A computer-implemented method of altering incoming call controls associated with a first telephone number after a call has been placed to an emergency number from a telephone associated with the first telephone number, the method comprising the steps of:
   detecting, with a processor, a call from a telephone associated with a first telephone number to a second telephone number that is an emergency call number;
   modifying, with a processor, incoming call controls associated with the first telephone number to an emergency call processing state based on the detection of the call from the telephone associated with the first telephone number to the second telephone number that is an emergency call number, wherein modifying the incoming call controls comprises:
      setting, with a processor, an emergency flag associated with the first telephone number; and
      starting, with a processor, a timer associated with the emergency flag;
   processing, with a processor, an incoming call to the first telephone number based on whether the incoming call controls are at an emergency call state, wherein processing the incoming call to the first telephone number comprises:
      determining, with a processor, whether the emergency flag associated with the first telephone number is set;
      determining, with a processor, whether the timer is active in response to determining the emergency flag associated with the first telephone number is set; and
      determining, with a processor, how to process the incoming call based on whether the emergency flag associated with the first telephone number is set and whether the time is active; and
   a predetermined time period after detecting the call to the second telephone number that is an emergency all number, modifying, with a processor, the incoming call controls associated with the first telephone number to remove the emergency call processing state, wherein modifying the incoming call controls associated with the first telephone number comprises:
      removing, with a processor, the emergency flag associated with the first telephone number; and
      setting, with a processor, a value of the timer to null.

2. A system for altering incoming call controls associated with a first telephone number after a call has been placed to an emergency number from a subscriber device associated with the first telephone number, the system comprising:
   a call processing module coupled to a subscriber device by way of a telecommunications network, the call processing module operative to:
   detect a call from the subscriber device associated with the first telephone number to a second telephone number that is an emergency call number;
   modify incoming call controls that are associated with the first telephone number to an emergency call processing state in response to detecting the call from the subscriber device associated with the first telephone number to the second telephone number that is an emergency call number, wherein to modify the incoming call controls, the call processing module is operative to:
      set an emergency flag associated with the first telephone number; and
      start a timer associated with the emergency flag;
   process an incoming call to the first telephone number based on whether the incoming call controls associated with the first telephone number are at an emergency call state, wherein to process the incoming call to the first telephone number the call processing module is operative to:
      determine whether the emergency flag associated with the first telephone number is set;
      determine whether the timer is active in response to determining the emergency flag associated with the first telephone number is set; and
      determine how to process the incoming call based on whether the emergency flag associated with the first telephone number is set and whether the time is active; and
   a predetermined time period after detecting the call from the subscriber device to the second telephone number that is an emergency all number, modifying the incoming call controls associated with the first telephone number to remove the emergency call processing state, wherein to modify the incoming call controls the call processing module is operative to:
      remove the emergency flag associated with the first telephone number; and
      set a value of the timer to null.

3. The system of claim 2 wherein a predetermined time period after detecting the call from the subscriber device to the second telephone number that is an emergency call number, the call processing module is operative to modify the incoming call controls associated with the first telephone number to remove the emergency call processing state and set the incoming call controls to at least one of:
- a privacy manager call control;
- an anonymous call rejection call control;
- a selective call forwarding call control;
- an interactive call screening call control; and
- an interactive call blocking call control.

4. The system of claim 2 further comprising:
a web portal application server coupled to the call processing module, the web portal application server operative to enable a subscriber to establish rules for modifying incoming call controls associated with the first telephone number in response to detecting an call from the subscriber device to a telephone number on a emergency call list.

5. The system of claim 4, further comprising:
a service management application server coupled to the web portal application server.

6. The system of claim 5, further comprising:
a real-time call processing module coupled to the service management application server.

7. A computer-readable storage medium comprising a set of instructions for altering incoming call controls associated with a first telephone number after a call has been placed to an emergency number, the set of instructions to direct a processor to perform acts of:
detecting an outbound call from a subscriber device associated with a first telephone number to a second telephone number on an emergency call list;
modifying incoming call controls, that are associated with the first telephone number and that are stored in a telephone network element, to an emergency call processing state based on the detecting of the outbound call from the subscriber device associated with the first telephone number to the second telephone number on the emergency call list, wherein modifying the incoming call controls comprises:
setting an emergency flag associated with the first telephone number; and
starting a timer associated with the emergency flag;
processing an incoming call to the subscriber device associated with the first telephone number based on whether the incoming call controls are at an emergency call state, wherein processing the incoming call to the subscriber device associated with the first telephone number comprises:
determining whether the emergency flag associated with the first telephone number is set;
determining whether the timer is active in response to determining the emergency flag associated with the first telephone number is set; and
determining how to process the incoming call based on whether the emergency flag associated with the first telephone number is set and whether the time is active; and
a predetermined time period after detecting the outbound call from the subscriber device to the second telephone number on the emergency call list, modifying the incoming call controls for the subscriber device associated with the first telephone number to remove the emergency call processing state, wherein modifying the incoming call controls comprises:
removing the emergency flag associated with the first telephone number; and
setting a value of the timer to null.

8. The computer-readable storage medium of claim 7, wherein the act of a predetermined time period after detecting the outbound call from the subscriber device to the second telephone number on the emergency call list, modifying the incoming call controls for the subscriber device to remove the emergency call processing state comprises:
modifying the incoming call controls for the subscriber device associated with the first telephone number to remove the emergency call processing state and set the incoming call controls to at least one of:
- a privacy manager call control;
- an anonymous call rejection call control;
- a selective call forwarding call control;
- an interactive call screening call control; and
- an interactive call blocking call control.

9. The computer-readable storage medium of claim 7, wherein processing the incoming call to the subscriber device based on whether the incoming call controls are at an emergency state comprises:
determining not to block the incoming call to the first telephone number in response to determining the incoming call controls are at an emergency call processing state.

10. A computer-implemented method of altering incoming call controls associated with a first telephone number after a call has been placed to an emergency number from a telephone associated with the first telephone number, the method comprising the steps of:
detecting, with a processor, a call from a telephone associated with a first telephone number to a second telephone number that is an emergency call number;
modifying, with a processor, incoming call controls associated with the first telephone number to an emergency call processing state based on the detection of the call from the telephone associated with the first telephone number to the second telephone number that is an emergency call number, wherein modifying the incoming call controls comprises:
setting, with a processor, an emergency flag associated with the first telephone number; and
starting, with a processor, a timer associated with the emergency flag;
determining, with a processor, to block an incoming call to the first telephone number based on the incoming call controls associated with the first telephone number being in an emergency call processing state, wherein determining to block the incoming call comprises:
determining, with a processor, whether the emergency flag associated with the first telephone number is set;
determining, with a processor, whether the timer is active in response to determining the emergency flag associated with the first telephone number is set; and
determining, with a processor, whether to block the incoming call based on whether the emergency flag associated with the first telephone number is set and whether the time is active; and
a predetermined time period after detecting the call to the second telephone number that is an emergency all number, modifying, with a processor, the incoming call controls associated with the first telephone number to remove the emergency call processing state, wherein modifying the incoming call controls comprises:
removing, with a processor, the emergency flag associated with the first telephone number; and
setting, with a processor, a value of the timer to null.

11. A computer-readable storage medium comprising a set of instructions for altering incoming call controls associated with a first telephone number after a call has been placed to an emergency number, the set of instructions to direct a processor to perform acts of:

detecting a call from a telephone associated with a first telephone number to a second telephone number that is an emergency call number;

modifying incoming call controls associated with the first telephone number to an emergency call processing state based on the detection of the call from the telephone associated with the first telephone number to the second telephone number that is an emergency call number, wherein modifying the incoming call controls comprises:

setting an emergency flag associated with the first telephone number; and starting a timer associated with the emergency flag;

determining to block an incoming call to the first telephone number based on the incoming call controls associated with the first telephone number being in an emergency call processing state, wherein determining to block the incoming call comprises:

determining whether the emergency flag associated with the first telephone number is set;

determining whether the timer is active in response to determining the emergency flag associated with the first telephone number is set; and determining whether to block the incoming call based on whether the emergency flag associated with the first telephone number is set and whether the time is active; and a predetermined time period after detecting the call to the second telephone number that is an emergency all number, modifying the incoming call controls associated with the first telephone number to remove the emergency call processing state, wherein modifying the incoming call controls comprises:

removing the emergency flag associated with the first telephone number; and setting a value of the timer to null.

\* \* \* \* \*